(12) United States Patent
Tsirkin (10) Patent No.: US 9,904,567 B2
(45) Date of Patent: Feb. 27, 2018

(54) LIMITED HARDWARE ASSISTED DIRTY PAGE LOGGING

(71) Applicant: Red Hat Israel, Ltd., Raanana (IL)

(72) Inventor: Michael Tsirkin, Yokneam Illit (IL)

(73) Assignee: Red Hat Israel, Ltd., Raanana (IL)

( * ) Notice: Subject to any disclaimer, the term of this patent is extended or adjusted under 35 U.S.C. 154(b) by 166 days.

(21) Appl. No.: 14/825,842

(22) Filed: Aug. 13, 2015

(65) Prior Publication Data

US 2017/0046186 A1 Feb. 16, 2017

(51) Int. Cl.
G06F 9/455 (2006.01)
G06F 12/12 (2016.01)
G06F 12/122 (2016.01)

(52) U.S. Cl.
CPC ...... *G06F 9/45558* (2013.01); *G06F 9/45533* (2013.01); *G06F 12/122* (2013.01); *G06F 2009/45583* (2013.01)

(58) Field of Classification Search
CPC ............ G06F 9/45558; G06F 9/45545; G06F 2009/45583; G06F 2009/45575; G06F 12/122; G06F 2212/69
See application file for complete search history.

(56) References Cited

U.S. PATENT DOCUMENTS

| 7,500,048 B1 | 3/2009 | Venkitachalam et al. |
| 8,356,120 B2 | 1/2013 | Tsirkin et al. |
| 8,788,739 B2 | 7/2014 | Chang et al. |
| 8,812,907 B1 | 8/2014 | Bissett et al. |
| 8,832,390 B1 | 9/2014 | Ahmad et al. |
| 2004/0117540 A1* | 6/2004 | Hahn ............... G06F 9/5083 711/100 |
| 2008/0126547 A1* | 5/2008 | Waldspurger ......... G06F 9/4881 709/226 |
| 2009/0327794 A1* | 12/2009 | Kapil .................. G06F 1/3203 713/600 |
| 2011/0167195 A1* | 7/2011 | Scales .............. G06F 9/45558 711/6 |

(Continued)

OTHER PUBLICATIONS

Zhu, "Improving the Performance of Hypervisor-Based Fault Tolerance", http://net.pku.edu.cn/vc/papers/ipdps2010.pdf, School of Electronics Engineering & Computer Science and State Key Labroatory of Advanced Optical Communication Systems & Networks Peking University, Beijing, China, 10 pages, 2010.

(Continued)

Primary Examiner — Michael Krofcheck
(74) Attorney, Agent, or Firm — Lowenstein Sandler LLP (57) ABSTRACT

A hypervisor identifies a set of pages to be polled for updates made by a guest operating system, each page having a write protection attribute that causes an exit to a hypervisor upon a guest operating system attempt to update a corresponding page. The hypervisor modifies the write protection attribute for each page of the set of pages to avoid the exit to the hypervisor upon the guest attempt to update the corresponding page. The hypervisor then initiates polling of the set of pages to detect updated pages, wherein detecting updated pages comprises detecting a status indicator set to a first value. The hypervisor then logs a modification of each updated page, and resets the status indicator to a second value to indicate that the modification to each updated page has been logged.

18 Claims, 5 Drawing Sheets

(56) References Cited

U.S. PATENT DOCUMENTS

2011/0302577 A1 12/2011 Reuther et al.
2015/0007172 A1* 1/2015 Hudzia ............... G06F 9/45533
      718/1
2015/0149687 A1* 5/2015 Tsirkin .................. G06F 12/109
      711/6

OTHER PUBLICATIONS

Deshpande, "Live Gang Migration of Virtual Machines", http://www.researchgate.net/profile/Umesh_Deshpande3/publication/220717237_Live_gang_migration_of_virtual_machines/links/0a85e53c539d4d004c000000.pdf, Computer Science Binghamton University, 12 pages, Jun. 8-11, 2011, San Jose, CA, USA.

Lu et al., "Virtual Machine Memory Access Tracing With Hypervisor Exlusive Cache", https://www.usenix.org/legacy/event/usenix07/tech/full_papers/lu/lu_html/usenix07.html, Department of Computer Science, University of Rochester, 15 pages, retrieved on May 28, 2015.

Ermolinsky et al. "Design and Implementation of a Hypervisor-Based Platform for Dynamic Information Flow Tracking in a Distributed Environment", http://www.eecs.berkeley.edu/Pubs/TechRpts/2011/EECS-2011-50.html, Electrical Engineering and Computer Sciences University of California at Berkeley, 159 pages, May 12, 2011.

* cited by examiner

LIMITED HARDWARE ASSISTED DIRTY PAGE LOGGING

TECHNICAL FIELD

The present disclosure is generally related to computer systems, and more particularly, to memory management in virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system."

In a virtualized environment, the hypervisor may abstract the physical layer and present this abstraction to a VM to use, by providing interfaces between the underlying hardware and virtual devices of the VM. Memory virtualization may be implemented by employing a page table (PT) which is a memory structure translating virtual memory addresses to physical memory addresses. A hypervisor may detect when a VM modifies memory by using "dirty page tracking."

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein are methods and systems for limited hardware assisted dirty page logging. In a virtualized environment, a hypervisor may detect when a VM modifies memory by using "dirty page tracking." A hypervisor may need to monitor when a VM modifies memory in order to copy the state of the VM for failover purposes, to copy the state of the VM to another host for VM migration, or for graphical frame buffer emulation. Upon completing the memory copying operation, the hypervisor may re-copy the memory pages which have been modified, or became "dirty," during the memory copying operation. Typically, dirty page tracking is implemented by write-protecting a page (to prevent writing data to a page), a page fault causing an exit to the hypervisor, the hypervisor logging the access and enabling writes to the page. However, these exits are computationally expensive and reduce overall performance. Modern CPUs can set a dirty bit in the page table of the hypervisor when a guest OS modifies a page. However, this may require that the hypervisor check all pages associated with the guest OS one at a time, which can also be computationally expensive for a guest OS with a large amount of memory.

Aspects of the present disclosure address the above noted and other deficiencies by implementing limited hardware assisted dirty page logging. The hypervisor can poll the dirty bit for only a subset of pages associated with a guest OS that are frequently updated. Thus, the number of exits produced by memory updates can be dramatically reduced. Moreover, by limiting the number of pages being polled, the computational expense of polling memory can also be reduced.

In an illustrative example, a hypervisor can receive a request to monitor a plurality of memory pages associated with a guest operating system (OS) of a virtual machine. The request may be associated with migrating the VM from one host to another, backing up the memory of the VM for fault tolerance purposes (e.g., disaster recovery backups, etc.), using the memory pages as a graphical frame buffer to forward information to a display, or the like. The request may be received from a user (e.g., an administrator) initiating VM migration via a user interface for a virtualization manager (e.g., a graphical user interface, command line interface, etc.), as a result of a change in the environment that causes a virtualization manager to initiate a VM migration, a client device that connects to the hypervisor requesting graphics updates, or in any similar manner.

The memory pages associated with the guest OS may each have a write protection attribute that, when modified appropriately, may cause an exit to the hypervisor (to transfer control to the hypervisor) upon a guest OS attempt to update any of the pages. In some implementations, the write protection attribute may be an attribute of the hypervisor page table entry associated with the particular memory page. The hypervisor may modify the write protection attribute (e.g., write protect the page) to cause the exit for each of the plurality of memory pages associated with the guest OS in response to the received request to monitor the memory pages. Subsequent attempts by the guest OS to update any of the memory pages may then cause an exit to the hypervisor. The hypervisor, upon detecting the exit, may then modify the write protection attribute to avoid further exits to the hypervisor, thereby permitting the guest OS to modify the page (e.g., remove write protection from the page).

Upon receiving the request to monitor the memory pages of the guest, the hypervisor may then identify a set of pages to be polled for updates made by the guest OS. The set of pages to be polled for updates may be a proper subset of the plurality of memory pages associated with the guest OS. The set of pages to be polled for updates may be memory pages that are most frequently updated by the guest OS. Each of the set of pages to be polled for updates may have the write protection attribute set to cause an exit to the hypervisor upon a guest OS attempt to update a page (e.g., write protected). The set of pages to be polled may be stored in a table accessible to the hypervisor, as a linked list of entries, or in any similar manner.

In some implementations, the set of pages to be polled may be identified by receiving the set of pages from the guest OS directly. The guest OS may send a list of page table entries to specifically identify the pages to be polled. Alternatively, the set of pages to be polled may be identified upon a first attempt by the guest OS to update a page. When a guest OS attempts to update a page for the first time, that page may be added to the set of pages to be polled. Alternatively, the hypervisor may add a page to the set of pages to be polled any time the guest OS attempts to update a write protected page, whether it is the first time or not. The hypervisor may detect that the guest OS has attempted to update a memory page of the plurality of pages associated with the guest OS by detecting an exit caused by the guest attempting to update a page that has the write protection attribute set to write protect the page. Upon detecting the exit (e.g., detecting an attempted update to the write protected page), the hypervisor may subsequently add the page to the set of pages to be polled for updates.

As noted above, the hypervisor may restrict the set of pages to be polled to those pages that are frequently updated by the guest OS. In some implementations, the hypervisor may implement a least recently used (LRU) policy to determine when to remove a page from the set of pages to be polled. When a new page is added to the set of pages to be polled, an entry representing the page (e.g., a unique identifier that represents the page, such as an address, etc.) may be added to the head of a list. Each subsequently added page is placed at the head of the list, pushing the other pages further down in the list. A page already on the list that is subsequently updated again by the guest OS may be moved to the head of the list. The page at the tail, or end, of the list may be the page that has been on the list the longest, and therefore, the least recently used page. While this example has been described using a list, it may be alternatively implemented as an array, a table, or in any other manner. For example, each page in the set of pages to be polled may be associated with a history indicator that can store information describing when the page was added to the set (such as a timestamp) or a value to indicate the page's position in a list (e.g., 1, 2, 3, etc.). Once a page has been added to the set of pages to be polled, the hypervisor may update the history indicator to indicate that the page has been recently updated.

The hypervisor may limit the number of pages in the set of pages to be polled in order to reduce the overhead involved with polling. Upon adding a page to the set of pages to be polled, the hypervisor may determine whether the number of pages in the set meets a predetermined threshold value. If so, the hypervisor may implement the LRU policy (e.g., or any other method for managing the number of pages in the set) to maintain the size of the set. Otherwise, additional pages may be added on subsequent attempts to update write protected pages by the guest OS. If the hypervisor has determined that the number of pages in the set has met a threshold, the hypervisor may select the least recently used page from the set by identifying the page having the history indicator set to a value that indicates that the page was not recently updated. For example, where the set is managed as a list with new pages at the head, the least recently used page may be the page at the tail of the list. Alternatively, the least recently used page may be the page with the oldest timestamp, or largest position value.

Once the least recently used page has been identified, the hypervisor may modify the write protection attribute for the least recently used page to cause an exit to the hypervisor upon a subsequent guest OS attempt to update that page (e.g., the hypervisor may re-instate write protection for that page). The hypervisor may then check the least recently used page to determine whether the page has been updated. In some implementations, the hypervisor may determine whether the page has been updated by inspecting a status indicator associated with the page. For example, the hypervisor may inspect a dirty page bit in the hypervisor page table associated with the page, and if set to a value that indicates that the page has been updated, the hypervisor may log the update. Logging the update may include sending a copy of the page to a remote destination (e.g., in the case of VM migration, or fault tolerance backup processing), sending the contents of the memory page to a connected client to update a display (e.g., in the case of graphics processing), or the like. Once any pending updates have been logged, the hypervisor may reset the status indicator in the hypervisor page tables and subsequently remove the least recently used page from the set of pages to be polled.

Once the hypervisor has identified the set of pages to be polled, the hypervisor may then modify the write protection attribute (e.g., remove write protection) for each page of the set of pages to be polled to avoid the exit to the hypervisor upon a guest attempt to update any of the corresponding pages. Subsequently, the hypervisor may initiate polling of the set of pages to detect updated pages. The hypervisor may initiate polling of the set of pages immediately after modifying the write protection attribute for each page to be polled. Alternatively, the hypervisor may initiate polling after a predetermined period of time. For example, the hypervisor may start a timer after modifying the write protection attribute for each page to be polled. Upon expiration of the timer, the hypervisor may initiate polling. In some implementations, as noted above, detecting an updated page may comprise detecting that the status indicator associated with a page has been set to a value that indicates the page has been updated. For example, the hypervisor may inspect a dirty page bit in the hypervisor page table associated with the page, and if set to a particular value (e.g., a '1' indicating the page has been updated, a '0' indicating the page has not been updated), the hypervisor may determine that the page has been updated.

Upon detecting an updated page while polling, the hypervisor may then log the modification to the updated page. As noted above, logging the update may include sending a copy of the page to a remote destination (e.g., in the case of VM migration, or fault tolerance backup processing), sending the contents of the memory page to a connected client to update a display (e.g., in the case of graphics processing), adding an entry to a log file to indicate that the page has been updated (e.g., so the update may be processed by another task at a later time), or the like.

Once the update has been logged (e.g., the update to the page has been processed), the hypervisor may then reset the status indicator to a second value to indicate that the modification to the updated page has been logged. For example, the hypervisor may reset the dirty bit in the hypervisor page table. The hypervisor may then update the history indicator of the updated page to indicate that the page has been recently updated. For example, the history indicator may be updated to the timestamp of the page modification. Alternatively, the history indicator may be updated with the position of the page in a list (e.g., at the head of the list). Thus, frequently updated pages can be prioritized (e.g., remain at the head of the list of the set of pages to be polled) such that the hypervisor can poll the status indicator of those pages first.

While polling, the hypervisor may determine that the status indicator associated with a page in the set of pages being polled has been reset to indicate that the page has not been updated (e.g., the dirty page indicator in the hypervisor page table has been reset). In some implementations, the hypervisor may then inspect the history indicator associated with the page to determine whether to retain the page in the set of pages being polled. If the history indicator of the page indicates that the page has not been recently used (e.g., the timestamp is old, the page is at the tail of the list of pages, etc.), the hypervisor may drop the page from the set of pages. The hypervisor may drop a page from the set of pages the first time it detects a page that has not been updated. Alternatively, the hypervisor may monitor the duration of time that the page has not been updated. The duration of time may be measured in clock time, processor cycles, number of polling cycles (e.g., the number of times the page has been polled by the hypervisor without having been updated), or in any other manner. If the duration of time that the page has not been updated meets a predetermined threshold (e.g., a particular amount of time, a particular number of polling cycles, etc.), the hypervisor may drop the page from the set of pages being polled.

If the hypervisor determines that a page should be dropped from the set of pages being polled, the hypervisor may modify the write protection attribute for the page to cause an exit to the hypervisor upon a guest OS attempt to update the page (e.g., reinstate write protection for the page). The hypervisor may then remove the page from the set of pages being polled.

Aspects of the present disclosure are thus capable of implementing limited hardware assisted dirty page logging. More particularly, polling only a subset of pages associated with a guest OS that are frequently updated can dramatically reduce both the number of exits produced by memory updates as well as the computational expense of polling memory.

Figure 1:
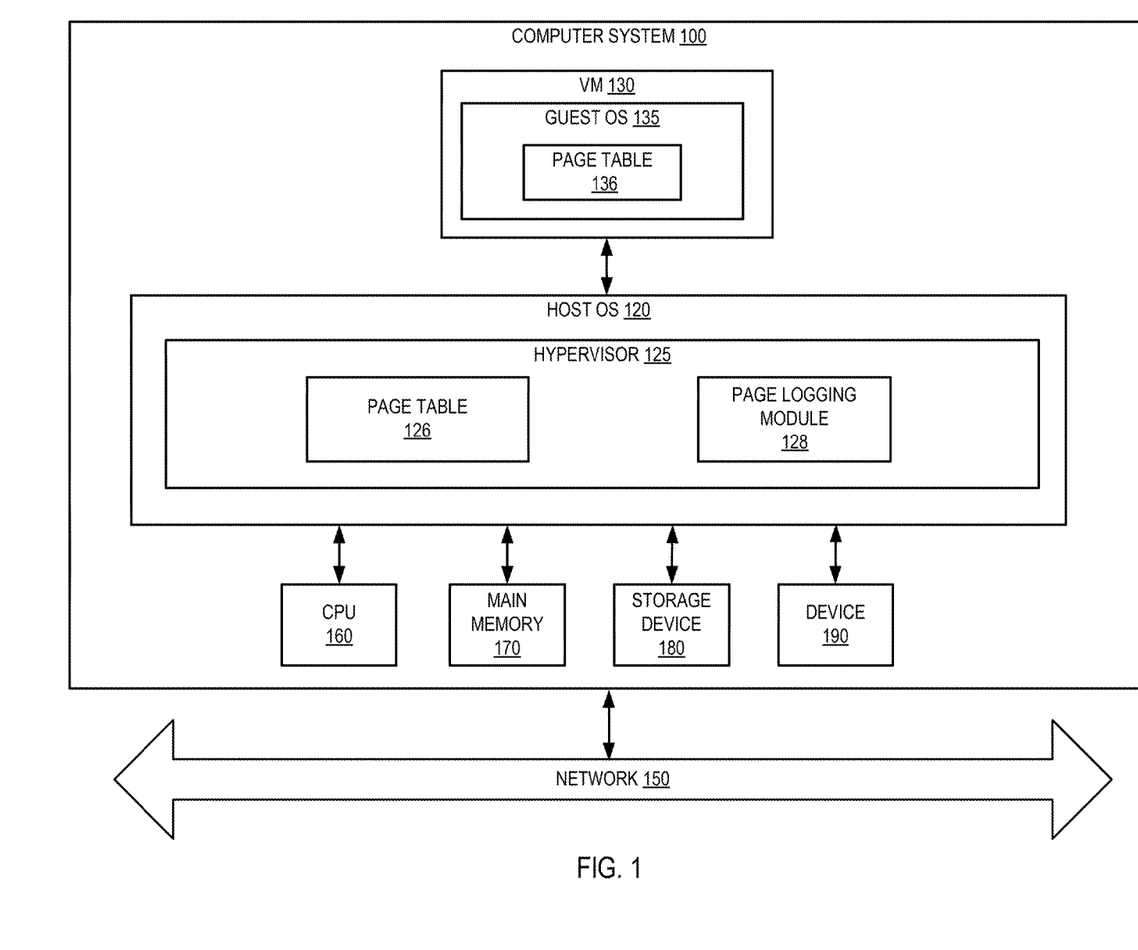
FIG. 1 depicts a high-level component diagram of an example computer system architecture, in accordance with one or more aspects of the present disclosure.

FIG. 1 depicts a high-level component diagram of an illustrative example of a computer system 100, in accordance with one or more aspects of the present disclosure. One skilled in the art will appreciate that other architectures for computer system 100 are possible, and that the implementation of a computer system utilizing examples of the invention are not necessarily limited to the specific architecture depicted by FIG. 1.

As shown in FIG. 1, the computer system 100 is connected to a network 150 and comprises one or more central processing units (CPU) 160, main memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, main memory 170 may be non-uniform access (NUMA), such that memory access time depends on the memory location relative to CPU 160. It should be noted that although, for simplicity, a single CPU 160, storage device 180, and device 190 are depicted in FIG. 1, other embodiments of computer system 100 may comprise a plurality of CPUs, storage devices, and devices.

The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

Computer system 100 may additionally comprise one or more virtual machine (VM) 130 and host operating system (OS) 120. VM 130 is a software implementation of a machine that executes programs as though it was an actual physical machine. Host OS 120 manages the hardware resources of the computer system and provides functions such as inter-process communication, scheduling, memory management, and so forth.

VM 130 may comprise a guest operating system (OS) 135 that handles the execution of applications within the virtual machine. Guest OS 135 may include a page table 136 that may be used by guest OS 135 to manage memory pages within the guest. It should be noted that although, for simplicity, a single VM 130 is depicted in FIG. 1, computer system 100 may host a plurality VMs 130.

Host OS 120 may comprise a hypervisor 125, which provides a virtual operating platform for VMs 130 and manages their execution. Hypervisor 125 may comprise page table 126 and page logging module 128. It should be noted that in some alternative implementations, hypervisor 125 may be external to host OS 120, rather than embedded within host OS 120, or may replace host OS 120.

Page logging module 128 can facilitate limited hardware assisted dirty page logging, as described in detail below with respect to FIGS. 2-4. Page logging module 128 may receive requests to monitor memory pages of guest OS 135, identify a subset of those pages that are frequently modified by guest OS 135, and poll the subset of pages for updates. Page table 126 may contain page table entries associated with the pages used by guest OS 135. If guest OS 135 updates a memory page, CPU 160 may modify the corresponding page table entries in page table 136 as well as page table 126 to indicate that the memory page has been updated (e.g., modifying a dirty page bit in the page table). Mapping table 127 can be an area of hypervisor memory, a shared memory space, a data structure saved in storage device 180, or the like.

Figure 2:
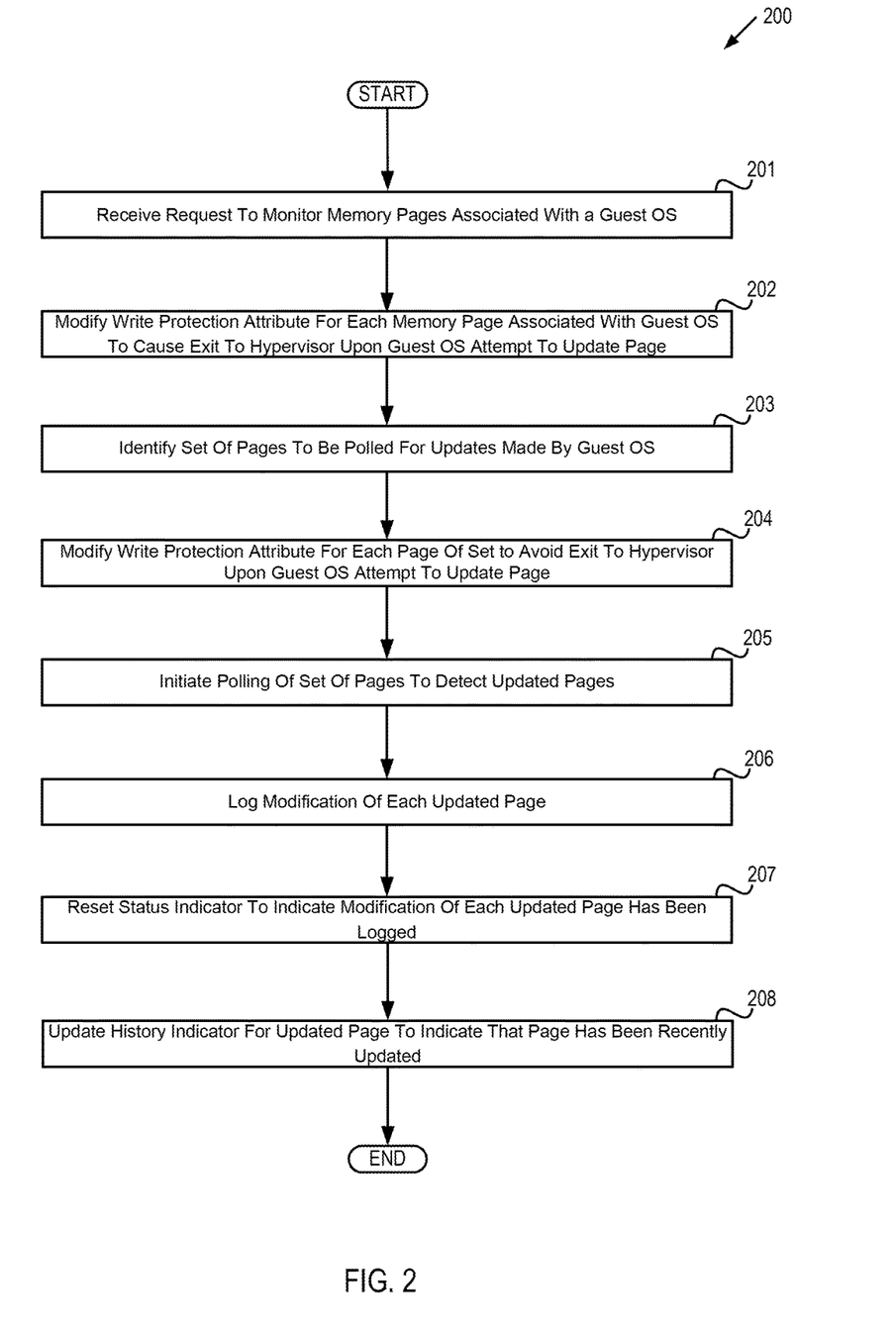
FIG. 2 depicts a flow diagram of a method for limited hardware assisted page logging, in accordance with one or more aspects of the present disclosure.
Figure 3:
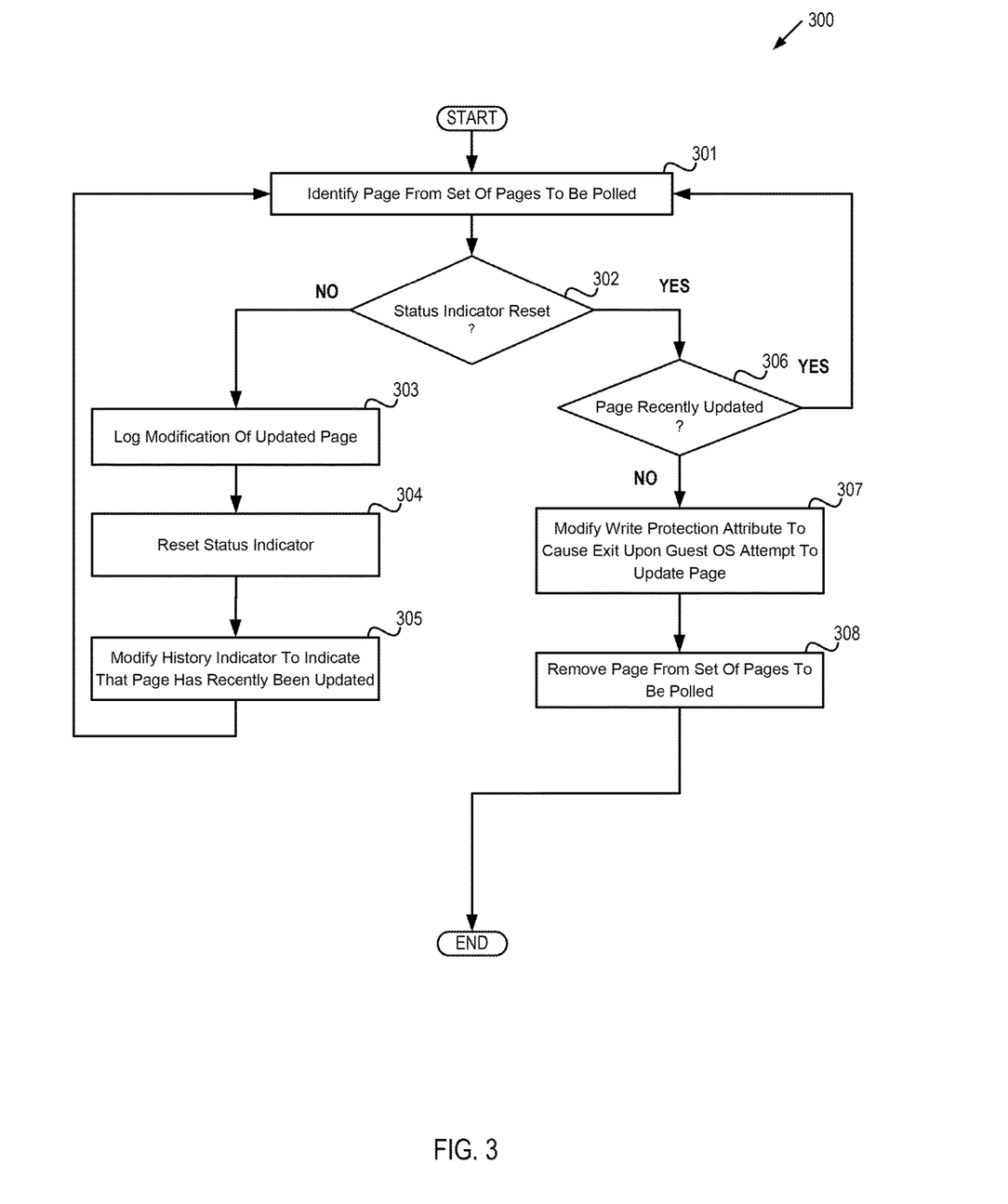
FIG. 3 depicts a flow diagram of a method for polling a set of frequently modified pages for page updates, in accordance with one or more aspects of the present disclosure.

FIG. 2 depicts a flow diagram of an example method 200 for limited hardware assisted page logging. The method may be performed by processing logic that may comprise hardware (circuitry, dedicated logic, etc.), software (such as is run on a general purpose computer system or a dedicated machine), or a combination of both. In one illustrative example, method 200 may be performed by page logging module 128 of hypervisor 125 in FIG. 1. Alternatively, some or all of method 200 might be performed by another module or machine. It should be noted that blocks depicted in FIG. 2 could be performed simultaneously or in a different order than that depicted.

At block 201, processing logic can receive a request to monitor memory pages associated with a guest OS of a VM. The request may be associated with migrating the VM from one host to another, backing up the memory of the VM for fault tolerance purposes (e.g., disaster recovery backups, etc.), using the memory pages as a graphical frame buffer to forward information to a display, or the like. The request may be received from a user (e.g., an administrator) initiating VM migration via a user interface for a virtualization manager (e.g., a graphical user interface, command line interface, etc.), as a result of a change in the environment that causes a virtualization manager to initiate a VM migration, a client device that connects to the hypervisor requesting graphics updates, or in any similar manner.

At block 202, processing logic can modify a write protection attribute for each memory page associated with the guest OS to cause an exit to a hypervisor upon a guest OS attempt to update the page (e.g., write protect each page). In some implementations, the write protection attribute may be an attribute of the hypervisor page table entry associated with the particular memory page. Subsequent attempts by the guest OS to update any of the memory pages may then cause an exit to the hypervisor. The hypervisor, upon detecting the exit, may then modify the write protection attribute to avoid further exits to the hypervisor, thereby permitting the guest OS to modify the page (e.g., remove write protection from the page).

At block 203, processing logic can identify a set of pages to be polled for updates made by the guest OS. The set of pages to be polled for updates may be a proper subset of the plurality of memory pages associated with the guest OS. The set of pages to be polled for updates may be memory pages that are most frequently updated by the guest OS. The set of pages to be polled may be stored in a table accessible to the hypervisor, as a linked list of entries, or in any similar manner. In some implementations, processing logic may identify the set of pages as described below with respect to FIG. 4.

At block 204, processing logic can modify the write protection attribute for each page of the set of pages to avoid the exit to the hypervisor upon a guest OS attempt to update the page (e.g., remove write protection). At block 205, processing logic can initiate polling of the set of pages to detect updated pages. Processing logic may initiate polling of the set of pages immediately after modifying the write protection attribute for each page to be polled. Alternatively, processing logic may initiate polling after a predetermined period of time. For example, processing logic may start a timer after modifying the write protection attribute for each page to be polled. Upon expiration of the timer, processing logic may initiate polling. In some implementations, detecting an updated page may comprise detecting that the status indicator associated with a page has been set to a value that indicates the page has been updated. For example, processing logic may inspect a dirty page bit in the hypervisor page table associated with the page, and if set to a particular value (e.g., a '1' indicating the page has been updated, a '0' indicating the page has not been updated), processing logic may determine that the page has been updated. In some implementations, processing logic may initiate polling of the set of pages as described below with respect to FIG. 3.

At block 206, processing logic can log the modifications of each updated page. Logging the modification of a page may include sending a copy of the page to a remote destination (e.g., in the case of VM migration, or fault tolerance backup processing), sending the contents of the memory page to a connected client to update a display (e.g., in the case of graphics processing), adding an entry to a log file to indicate that the page has been updated (e.g., so the update may be processed by another task at a later time), or the like.

At block 207, processing logic can reset the status indicator to indicate that modification of each updated page has been logged. For example, processing logic may reset the dirty bit in the hypervisor page table.

At block 208, processing logic can update a history indicator for each updated page to indicate that the page has been recently updated. For example, the history indicator may be updated to the timestamp of the page modification. Alternatively, the history indicator may be updated with the position of the page in a list (e.g., at the head of the list). Thus, frequently updated pages can be prioritized (e.g., remain at the head of the list of the set of pages to be polled) such that the hypervisor can poll the status indicator of those pages first. After block 208, the method of FIG. 2 terminates FIG. 3 depicts a flow diagram of an example method 300 for polling a set of frequently modified pages for page updates. The method may be performed by processing logic that may comprise hardware (circuitry, dedicated logic, etc.), software (such as is run on a general purpose computer system or a dedicated machine), or a combination of both. In one illustrative example, method 300 may be performed by page logging module 128 of hypervisor 125 in FIG. 1. Alternatively, some or all of method 300 might be performed by another module or machine. It should be noted that blocks depicted in FIG. 3 could be performed simultaneously or in a different order than that depicted.

At block 301, processing logic can identify a page from the set of pages being polled. At block 302, processing logic can determine whether a status indicator associated with the page selected at block 301 has reset to a value that indicates that the page has not been updated (e.g., whether the dirty page indicator in the hypervisor page table has been reset). If not, processing logic continues to block 303.

At block 303, upon determining that the status indicator has been set to a value indicating that the page has been updated (e.g., the dirty bit has been set in the hypervisor page table entry for the page), processing logic can log the modification of the page.

At block 304, processing logic can reset the status indicator to indicate that the page modification has been logged (e.g., reset the dirty bit in the hypervisor page table entry for the page). At block 305, processing logic can modify the status indicator associated with the page to indicate that the page has been recently updated. After block 305, processing logic can return to block 301 to identify the next page in the set of pages being polled.

If, at block 302, processing logic has determined that the status indicator has been reset, processing logic proceeds to block 306. At block 306, processing logic can determine whether the page has been recently updated. For example, processing logic may inspect the history indicator of the page to determine the page has not been recently updated (e.g., the timestamp is older than those for other pages in the set, the page is at the tail of the list of pages, etc.). If so, processing logic can return to block 301 to identify the next page. Otherwise, processing logic can proceed to block 307 to remove the page from the set of pages being polled.

At block 307, processing logic can modify the write protection attribute for the page to cause an exit to the hypervisor upon subsequent guest OS attempts to update the page (e.g., reinstate write protection for the page). At block 308, processing logic can remove the page from the set of pages being polled. After block 308, the method of FIG. 3 terminates.

Figure 4:
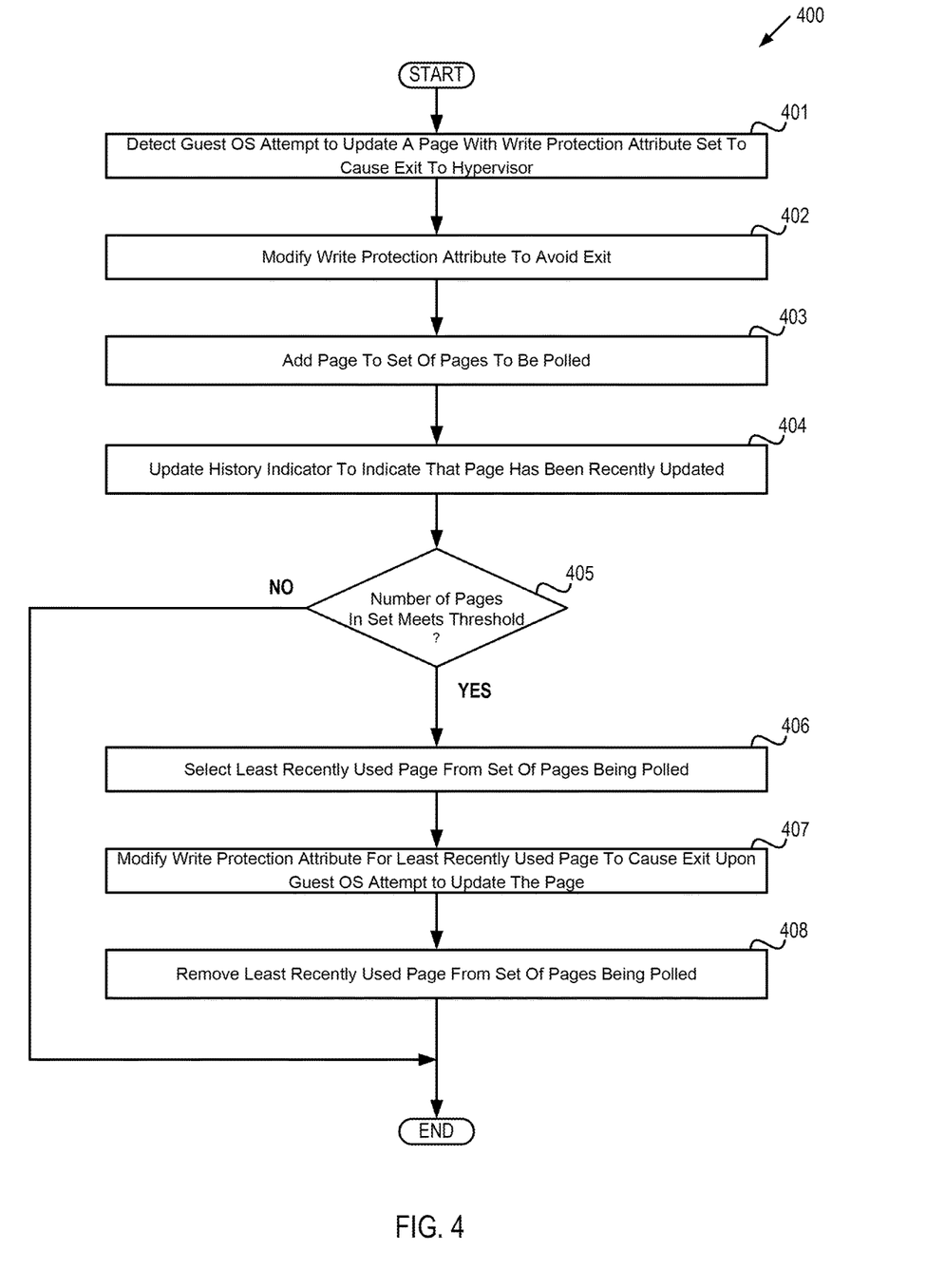
FIG. 4 depicts a flow diagram of a method for identifying a set of pages to be polled for updates, in accordance with one or more aspects of the present disclosure.

FIG. 4 depicts a flow diagram of an example method 400 for identifying a set of pages to be polled for updates. The method may be performed by processing logic that may comprise hardware (circuitry, dedicated logic, etc.), software (such as is run on a general purpose computer system or a dedicated machine), or a combination of both. In one illustrative example, method 400 may be performed by page logging module 128 of hypervisor 125 in FIG. 1. Alternatively, some or all of method 400 might be performed by another module or machine. It should be noted that blocks depicted in FIG. 4 could be performed simultaneously or in a different order than that depicted.

At block 401, processing logic can detect a guest OS attempt to update a page that has its write protection attribute set to cause an exit to the hypervisor. Processing logic may detect the attempt to update a page by detecting the exit caused by the write protection of the page. At block 402, processing logic can modify the write protection attribute of the page to avoid the exit to the hypervisor upon subsequent guest OS attempts to modify the page. At block 403, processing logic can add the page to the set of pages to be polled for updates. At block 404, processing logic can update the history indicator associated with the page to indicate that the page has been recently updated.

At block 405, processing logic can determine whether the number of pages in the set of pages being polled meets a predetermined threshold. If not, additional pages may be added to the set of pages being polled, so the method of FIG. 4 terminates. Otherwise, processing may proceed to block 406.

At block 406, processing logic can select a least recently used page from the set of pages being polled. In some implementations, processing logic may implement an LRU policy (e.g., or any other method for managing the number of pages in the set) to maintain the size of the set. For example, where the set is managed as a list with new pages at the head, the least recently used page may be the page at the tail of the list. Alternatively, the least recently used page may be the page with the oldest timestamp, or largest position value.

Figure 5:
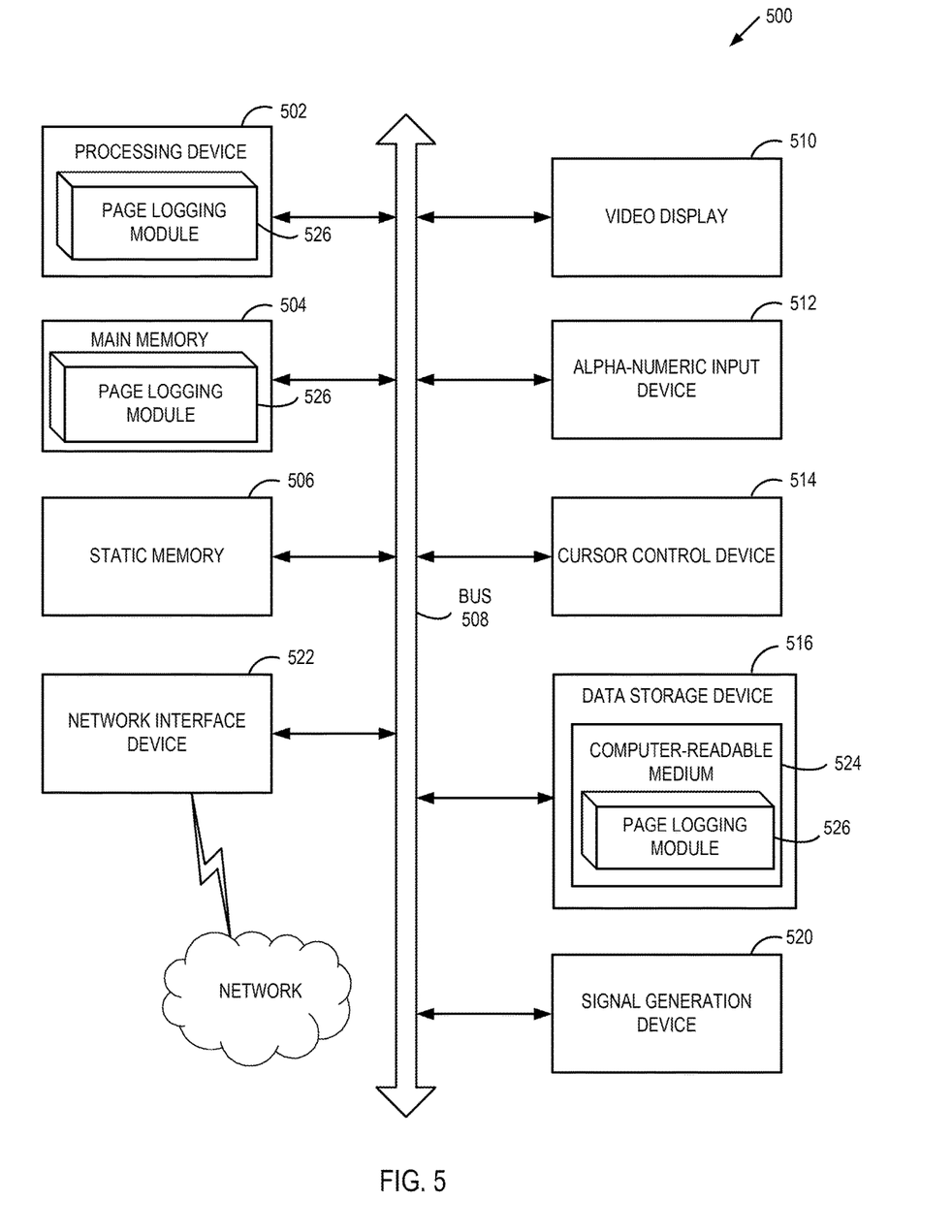
FIG. 5 depicts a block diagram of an illustrative computer system operating in accordance with examples of the invention.

At block 407, processing logic can modify the write protection attribute for the least recently used page to cause an exit upon a subsequent guest OS attempt to update the page (e.g., processing logic may re-instate write protection for that page). At block 408, processing logic can remove the least recently used page from the set of pages being polled. After block 408, the method of FIG. 4 terminates FIG. 5 depicts an example computer system 500 which can perform any one or more of the methods described herein. In one example, computer system 500 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 902 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to page logging module 526 for performing the operations and steps discussed herein (e.g., corresponding to the methods of FIGS. 2-4, etc.).

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker). In one illustrative example, the video display unit 510, the alphanumeric input device 512, and the cursor control device 514 may be combined into a single component or device (e.g., an LCD touch screen).

The data storage device 516 may include a computer-readable medium 524 on which is stored page logging module 526 (e.g., corresponding to the methods of FIGS. 2-4, etc.) embodying any one or more of the methodologies or functions described herein. Page logging module 526 may also reside, completely or at least partially, within the main memory 504 and/or within the processing device 502 during execution thereof by the computer system 500, the main memory 504 and the processing device 502 also constituting computer-readable media. Page logging module 526 may further be transmitted or received over a network via the network interface device 522.

While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "modifying," "initiating," "logging," "resetting," "receiving," "updating," "determining," "detecting," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
receiving a request to monitor a plurality of memory pages associated with a guest operating system, each of the plurality of memory pages having a write protection attribute that causes an exit to a hypervisor upon a guest operating system attempt to update a corresponding page;
in response to a guest operating system attempt to update a first page of the plurality of memory pages, identifying, by a processing device executing the hypervisor, a subset of the plurality of memory pages that is to be polled for updates made by the guest operating system;
modifying, by the hypervisor, the write protection attribute for each page of the subset of pages to avoid the exit to the hypervisor upon the guest operating system attempt to update the corresponding page;
initiating, by the hypervisor, polling of the subset of pages to detect updated pages, wherein detecting updated pages comprises detecting a status indicator set to a first value;
logging a modification of each updated page; and
resetting the status indicator to a second value to indicate that the modification to each updated page has been logged.

2. The method of claim 1, further comprising:
updating a history indicator of each updated page to indicate that each updated page has been recently updated.

3. The method of claim 2, further comprising:
determining that the status indicator associated with a first page of the subset of pages to be polled has been reset to the second value;
determining that the history indicator of the first page indicates that the page has not been recently updated;

modifying the write protection attribute for the first page to cause the exit to the hypervisor upon the guest operating system attempt to update the first page; and removing the first page from the subset of pages to be polled.

4. The method of claim 1, wherein identifying the subset of pages to be polled for updates comprises:

detecting that the guest operating system has attempted to update a second page of the plurality of pages associated with the guest operating system, the second page having the write protection attribute set to cause the exit to the hypervisor;

adding the second page to the subset of pages to be polled for updates; and updating a history indicator of the second page to indicate that the second page has been recently updated.

5. The method of claim 4, further comprising:

determining that the subset of pages to be polled comprises a number of pages that meets a predetermined threshold;

selecting a least recently used page from the subset of pages to be polled, the least recently used page having the history indicator set to a value that indicates the least recently used page was not recently updated;

modifying the write protection attribute for the least recently used page to cause the exit to the hypervisor upon a guest operating system attempt to update the least recently used page; and removing the least recently used page from the subset of pages to be polled.

6. The method of claim 1, wherein identifying the subset of pages to be polled for updates comprises:

receiving the subset of pages to be polled from the guest operating system.

7. A computing apparatus comprising:

a memory to store instructions; and a processing device, operatively coupled to the memory, to execute the instructions, wherein the processing device is to:

receive a request to monitor a plurality of memory pages associated with a guest operating system, each of the plurality of memory pages having a write protection attribute that causes an exit to a hypervisor upon a guest operating system attempt to update a corresponding page;

in response to a guest operating system attempt to update a first page of the plurality of memory pages, identify, by the hypervisor, a subset of the plurality of memory pages that is to be polled for updates made by the guest operating system;

modify, by the hypervisor, the write protection attribute for each page of the subset of pages to avoid the exit to the hypervisor upon the guest operating system attempt to update the corresponding page;

initiate, by the hypervisor, polling of the subset of pages to detect updated pages, wherein to detect updates, the processing device is to detect a status indicator set to a first value;

log a modification of each updated page; and reset the status indicator to a second value to indicate that the modification to each updated page has been logged.

8. The apparatus of claim 7, wherein the processing device is further to:

update a history indicator of each updated page to indicate that each updated page has been recently updated.

9. The apparatus of claim 8, wherein the processing device is further to:

determine that the status indicator associated with the first page of the subset of pages to be polled has been reset to the second value;

determine that the history indicator of the first page indicates that the page has not been recently updated;

modify the write protection attribute for the first page to cause the exit to the hypervisor upon the guest operating system attempt to update the first page; and remove the first page from the subset of pages to be polled.

10. The apparatus of claim 7, wherein to identify the subset of pages to be polled for updates, the processing device is to:

detect that the guest operating system has attempted to update a second page of the plurality of pages associated with the guest operating system, the second page having the write protection attribute subset to cause the exit to a hypervisor;

add the second page to the subset of pages to be polled for updates; and update a history indicator of the second page to indicate that the second page has been recently updated.

11. The apparatus of claim 10, wherein the processing device is further to:

determine that the subset of pages to be polled comprises a number of pages that meets a predetermined threshold;

select a least recently used page from the subset of pages to be polled, the least recently used page having the history indicator set to a value that indicates the least recently used page was not recently updated;

modify the write protection attribute for the least recently used page to cause the exit to the hypervisor upon a guest operating system attempt to update the least recently used page; and remove the least recently used page from the subset of pages to be polled.

12. The apparatus of claim 7, wherein to identify the subset of pages to be polled for updates, the processing device is to:

receive the subset of pages to be polled from the guest operating system.

13. A non-transitory computer readable storage medium, having instructions stored therein, which when executed by a processing device of a computer system, cause the processing device to:

receive, by the a hypervisor, a request to monitor a plurality of memory pages associated with a guest operating system, each of the plurality of memory pages having a write protection attribute that causes an exit to a hypervisor upon a guest operating system attempt to update a corresponding page;

in response to a guest operating system attempt to update a first page of the plurality of memory pages, identify, by the hypervisor, a subset of the plurality of memory pages that is to be polled for updates made by the guest operating system;

modify, by the hypervisor, the write protection attribute for each page of the subset of pages to avoid the exit to the hypervisor upon the guest operating system attempt to update the corresponding page;

initiate, by the hypervisor, polling of the subset of pages to detect updated pages, wherein to detect updates, the processing device is to detect a status indicator set to a first value;

log a modification of each updated page; and
reset the status indicator to a second value to indicate that the modification to each updated page has been logged.

14. The non-transitory computer readable storage medium of claim 13, wherein the processing device is further to:
update a history indicator of each updated page to indicate that each updated page has been recently updated.

15. The non-transitory computer readable storage medium of claim 14, wherein the processing device is further to:
determine that the status indicator associated with the first page of the subset of pages to be polled has been reset to the second value;
determine that the history indicator of the first page indicates that the page has not been recently updated;
modify the write protection attribute for the first page to cause the exit to the hypervisor upon the guest operating system attempt to update the first page; and
remove the first page from the subset of pages to be polled.

16. The non-transitory computer readable storage medium of claim 13, wherein to identify the subset of pages to be polled for updates, the processing device is to:
detect that the guest operating system has attempted to update a second page of the plurality of pages associated with the guest operating system, the second page having the write protection attribute subset to cause the exit to the hypervisor;
add the second page to the subset of pages to be polled for updates; and
update a history indicator of the second page to indicate that the second page has been recently updated.

17. The non-transitory computer readable storage medium of claim 16, wherein the processing device is further to:
determine that the subset of pages to be polled comprises a number of pages that meets a predetermined threshold;
select a least recently used page from the subset of pages to be polled, the least recently used page having the history indicator set to a value that indicates the least recently used page was not recently updated;
modify the write protection attribute for the least recently used page to cause the exit to the hypervisor upon a guest operating system attempt to update the least recently used page; and
remove the least recently used page from the subset of pages to be polled.

18. The non-transitory computer readable storage medium of claim 13, wherein to identify the set of pages to be polled for updates, the processing device is to:
receive the subset of pages to be polled from the guest operating system.

* * * * *